United States Patent Office 2,929,851
Patented Mar. 22, 1960

2,929,851

PREPARATION OF POLYHALO SUBSTITUTED BENZENES

John P. Luvisi, Park Ridge, Ill., assignor, by mesne assignments, to Universal Oil Products Company, Des Plaines, Ill., a corporation of Delaware No Drawing. Application June 26, 1958
Serial No. 744,662

9 Claims. (Cl. 260—650)

This invention relates to a novel method for preparing polyhalo substituted aromatic compounds and more particularly to a method of preparing polyhalo substituted benzenes.

The compounds of the present invention which are prepared by the novel method hereinafter set forth contain polyhalo substituents on an aromatic nucleus and find a wide variety of uses in the chemical field. For example, hexachlorobenzene is an efficient fungicide, being especially effective when used against bunt disease in wheat (a destructive kernel smut of wheat with ill smelling spores). In addition the compounds prepared according to this invention may also be used as insecticides as well as intermediates in the preparation of resins, pharmaceuticals, plastics and the like.

It is therefore an object of this invention to provide a novel method for the preparation of halo substituted aromatic compounds possessing fungicidal and insecticidal activity.

A further object of this invention is to provide a novel method for the preparation of polychloro substituted benzenes possessing fungicidal activity.

One embodiment of this invention resides in a process for the preparation of a polyhalo substituted benzene which comprises reacting a compound selected from the group consisting of halo substituted butadienes and halo substituted cyclopentadienes with a halo substituted acetaldehyde at a temperature above about 260° C., and recovering the resultant polyhalo substituted benzene.

A further embodiment of the invention is found in a process for the preparation of a polychloro substituted benzene which comprises reacting a compound selected from the group consisting of polychloro substituted butadienes and polychloro substituted cyclopentadienes with a polychloro substituted acetaldehyde at a temperature above about 260° C. and at a pressure in the range of from about 2 to about 100 atmospheres, and recovering the resultant polychloro substituted benzene.

A specific embodiment of the invention resides in a process for the preparation of hexachlorobenzene which comprises reacting hexachlorocyclopentadiene with trichloroacetaldehyde at a temperature in the range of from about 260° to about 325° C. and at a pressure in the range of from about 2 to about 100 atmospheres, and recovering the resultant hexachlorobenzene.

Other objects and embodiments referring to alternative halo substituted butadienes, halo substituted cyclopentadienes and halo substituted acetaldehydes will be found in the following further detailed description of the invention.

As hereinbefore set forth it has now been discovered that halo substituted aromatic compounds and particularly halo substituted benzenes may be prepared by reacting a halo substituted cyclopentadiene or butadiene with a halo substituted acetaldehyde at temperatures ranging from about 260° to about 325° C. The obtention of this product is unexpected inasmuch as the expected product of such a reaction would be the Diels-Alder adduct of the two compounds. For example, the expected product of the reaction between hexachlorocyclopentadiene and trichloroacetaldehyde would be 6-(trichloromethyl) - 5 - oxa - 1,2,3,4,7,7-hexachlorobicyclo[2.2.1]-2-heptene rather than the hexachlorobenzene which was actually obtained when these two reactants were heated at a temperature of about 300° C. For purposes of this invention the term "halo substituted" will refer to both mono- and polyhalo substituted butadienes, cyclopentadienes and acetaldehydes. The reaction product which is obtained by the method of this invention will comprise a compound having the empirical formula $C_6X_nH_{6-n}$ in which X is a halogen selected from the group consisting of chlorine, bromine, fluorine and iodine, the preferred halogens being those having an atomic weight of between 35 and 80 (i.e. chlorine and bromine) and $n$ is an integer of from 4 to 6. It is contemplated within the scope of this invention that the other halogens, namely, fluorine and iodine may also be used although not necessarily with equivalent results.

Examples of halo substituted cycloalkadienes which may be used in this invention include the halo substituted 1,3-cyclopentadienes (hereinafter referred to as cyclopentadiene) such as 1-chlorocyclopentadiene, 2-chlorocyclopentadiene, 5-chlorocyclopentadiene, 1,2-dichlorocyclopentadiene, 1,3-dichlorocyclopentadiene, 1,4-dichlorocyclopentadiene, 5,5-dichlorocyclopentadiene, 1,2,3-trichlorocyclopentadiene, 1,5,5-trichlorocyclopentadiene, 1,2,3,4-tetrachlorocyclopentadiene, 1,2,3,4,5 - pentachlorocyclopentadiene, hexachlorocyclopentadiene, 1-bromocyclopentadiene, 2-bromocyclopentadiene, 5-bromocyclopentadiene, 1,2-dibromocyclopentadiene, 1,3-dibromocyclopentadiene, 1,4-dibromocyclopentadiene, 5,5-dibromocyclopentadiene, 1,2,3-tribromocyclopentadiene, 1,5,5-tribromocyclopentadiene, 1,2,3,4-tetrabromocyclopentadiene, 1,2,3,4,5-pentabromocyclopentadiene, hexabromocyclopentadiene, 1-fluorocyclopentadiene, 2-fluorocyclopentadiene, 5-fluorocyclopentadiene, 1,2-difluorocyclopentadiene, 1,3-difluorocyclopentadiene, 1,4-difluorocyclopentadiene, 5,5-difluorocyclopentadiene, 1,2,3-trifluorocyclopentadiene, 1,5,5-trifluorocyclopentadiene, 1,2,3,4-tetrafluorocyclopentadiene, 1,2,3,4,5-pentafluorocyclopentadiene, hexafluorocyclopentadiene, the iodo substituted cyclopentadienes, etc. Halo substituted 1,3-butadienes, hereinafter referred to as butadienes, which may be used includes 1-chlorobutadiene, 2-chlorobutadiene, 1,2-dichlorobutadiene, 1,2,3-trichlorobutadiene, 1,2,3,4-tetrachlorobutadiene, hexachlorobutadiene, 1-bromobutadiene, 2-bromobutadiene, 1,2-dibromobutadiene, 1,2,3-tribromobutadiene, 1,2,3,4-tetrabromobutadiene, hexabromobutadienes, 1-fluorobutadiene, 2-fluorobutadiene, 1,2-difluorobutadiene, 1,2,3-trifluorobutadiene, 1,2,3,4-tetrafluorobutadiene, hexafluorobutadiene, the iodo substituted butadienes, etc. Halo substituted acetaldehydes which may be reacted with the aforementioned halo substituted cycloalkadienes include trichloroacetaldehyde (chloral), tribromoacetaldehyde, trifluoroacetaldehyde, etc. In the preferred reaction of the present invention the halo substituents on both the cycloalkadiene and the acetaldehyde are identical although it is contemplated within the scope of this invention that cycloalkadienes and acetaldehydes containing dissimilar halo substituents may be reacted, although not necessarily with equivalent results.

The process of this invention is effected at elevated temperatures and pressures, the temperature being above about 260° C. and preferably within the range of from about 270° to about 325° C., and at a superatmospheric pressure in the range of from about 2 to about 100 atmospheres or more, the amount of said pressure being that which is necessary to maintain at least a portion of the reactants in the liquid phase.

The process of this invention may be effected in any suitable manner and may comprise either a batch or a continuous type operation. For example, when a batch type operation is used, a mixture of the desired reactants are placed in an appropriate apparatus such as a rotating autoclave which is thereafter sealed and an inert gas such as nitrogen pressed in until the desired pressure has been reached. The autoclave is then heated to the desired reaction temperature and maintained thereat for a predetermined period of time. Upon completion of the desired reaction time the apparatus and contents thereof are cooled to room temperature, the excess pressure is vented and the desired reaction product is recovered by conventional means such as filtration, fractional distillation, crystallization, etc.

The process of this invention may also be effected in a continuous type operation. When this method is used the starting materials comprising the halo substituted cycloalkadiene or halo substituted butadiene and the halo substituted acetaldehyde are continuously charged to a reaction zone which is maintained at the proper operating conditions of temperature and pressure. The reaction may comprise an unpacked vessel or coil or may be lined with an adsorbent packing material such as fire brick, dehydrated bauxite, alumina and the like. Upon completion of the desired residence time the reaction product is continuously withdrawn, separated from the reactor effluent and recovered by conventional means hereinbefore set forth, while the effluent may be separated and recycled to form a portion of the feed stock. If so desired, the two reactants may be admixed prior to entry into said reactor and charged thereto in a single stream.

The physical properties of the polyhalo substituted benzenes and the effects they have on entomological forms of life make them particularly desirable as fungicides and insecticides, the compounds having many of the features desired of materials for this purpose. They are, for example, effective in controlling destructive fungus diseases in plants, especially the bunt disease in wheat which is caused by a destructive kernel smut of the wheat which produces black masses of spores (sori), thus rendering the wheat inedible. In addition, they are, for example, toxic to insects which are destructive of plant life and materials normally subject to insect infestation, their toxic effects being manifested by contact of the poison with the insect. The insecticide comprising the present compounds are thus effective against chewing as well as sucking types of insects. The compounds are sufficiently volatile so that when applied to plant life intended for subsequent human consumption, the plants when harvested and after allowing a reasonable time for evaporation of the applied insecticide therefrom, retain none of the toxicant to prevent the use of the plant for consumption as food. On the other hand, the compounds are of sufficiently limited volatility to be retained on the insect for the time required to accomplish the toxic effect of the compounds. The volatility and retentive capacity of the compounds may be varied at will by combining them with suitable fixing agents which reduce or promote their volatilization, as desired. Thus, the compounds may be dissolved in a suitable high boiling solvent, such as a mineral or vegetable oil, petroleum, etc.; a wax, such as paraffin wax, beeswax, etc.; a high molecular weight alcohol or ether such as myricyl alcohol, dibutyl ether, etc.; or they may be emulsified with water by the addition of an emulsifying agent, such as a surface active agent, to the mixture of components. The latter solvents and dispersants may also be employed for the specific purpose of reducing the concentration of insecticide to the desired level in a specific insecticidal formulation. The particular formulation of active components in combination with the solvent or dispersant will depend upon its application. Compositions containing as high as 20% of active component may be preferred, in some instances where deep penetration of the insecticide is desired, as in the treatment of fibrous material, such as wood, for extinction of a particular infestation, for example, wood termites. For other purposes the required concentration of active components in the formulation may be as low as 0.1%, as for example, in the treatment of fabrics for destroying moth larvae.

In utilizing the present insecticidal compounds against most insects, a composition containing from about 0.1% to about 5% by weight of the active component is highly effective. The choice of the most desirable solvent or dispersant further depends upon the method utilized to apply the insecticidal composition to the infested article, for example, a low molecular weight, normally gaseous carrying agent. The active insecticidal component, such as propane, butane, the Freons, etc., may be compressed and liquefied into a small bomb containing the insecticide. Upon release of pressure from the bomb, the liquefied carrier vaporizes and suspends a quantity of the active component therein, thus providing a convenient spraying method of applying the insecticides. The active component may also be dissolved in a liquid carrier, such as kerosene, an alcohol, ester, ketone, etc., and the resulting solution atomized by a suitable spraying device.

The following examples are given to illustrate the process of the present invention, which, however, are not intended to limit the generally broad scope of the present invention in strict accordance therewith.

*Example I*

Fifty-four grams (0.2 mole) of hexachlorocyclopentadiene and 30 g. (0.2 mole) of trichloroacetaldehyde were placed in the glass liner of a rotating autoclave having a capacity of 850 cc. The glass liner was sealed into the autoclave and nitrogen pressed in until an initial pressure of 30 atmospheres had been reached. The autoclave was then heated to a temperature of about 300° C. and maintained thereat for a period of about 6 hours. During this time the maximum pressure in the autoclave rose to 86 atmospheres. At the end of the aforementioned period of time the autoclave and contents thereof were cooled to room temperature, the final pressure at room temperature being 42 atmospheres. The autoclave exit gas was discharged through a soda lime tower which gained 11 g. and a non-condensible gas sample was taken. The non-condensible gas contained 82% nitrogen and 15.2% carbon monoxide along with lesser amounts of pentenes, propane, ethylene and oxygen. The crude reaction product consisted of 56 g. of a crystalline mass (long needles) along with a small amount of amber liquid. This product was filtered and 16 g. of crystalline material was recovered. The filtrate was subjected to fractional distillation and 11 g. of a viscous oil containing an additional amount of this same crystalline material was recovered. The melting point of the crystalline materials was 222° C. and when mixed with a known sample of hexachlorobenzene showed no depression or elevation of the melting point.

*Example II*

Fifty-two grams (0.22 mole) of hexachlorobutadiene and 30 g. (0.20 mole) of trichloroacetaldehyde were placed in the glass liner of a rotating autoclave. The liner was sealed into the autoclave and nitrogen pressed in until an initial pressure of 30 atmospheres had been reached. The autoclave and contents thereof were then heated to a temperature of approximately 300° C. and maintained thereat for a period of 5.5 hours. During this time the pressure in the autoclave reached a maximum of 87 atmospheres. At the end of the aforementioned period of time the autoclave and contents thereof were cooled to room temperature, the final pressure at room temperature being 41 atmospheres. The autoclave exit gas was then discharged into a soda lime tower which gained 8 g. and a non-condensible gas sample was taken. The exit gas contained approximately 82% nitrogen, 15.2% carbon monoxide along with lesser amounts of oxygen, propane, ethylene and the pentenes. The reaction product comprising 59 g. of a crystalline mass along with a small amount of amber liquid was filtered. The filtrate subjected to fractional distillation and an additional amount of crystalline material was recovered. Five grams of hexachlorobenzene having a melting point of 222° C. was recovered.

*Example III*

To demonstrate the necessity of having both trichloroacetaldehyde (chloral) and either a polyhalo substituted cyclopentadiene or a polyhalo substituted butadiene present to obtain the desired hexahalobenzene another experiment was performed in which hexachlorobutadiene alone was heated to a temperature of 300° C. In this experiment 52 g. of hexachlorobutadiene was placed in a rotating autoclave. Nitrogen was pressed in until an initial pressure of 30 atmospheres had been reached. The autoclave and contents thereof were then heated to a temperature of 300° C. and maintained thereat for a period of 6 hours. During this time the maximum pressure rose to 60 atmospheres. However, upon cooling the final product at room temperature dropped back to 30 atmospheres. When the product was treated in the manner described in Example II, it was found that no reaction had occurred and no hexachlorobenzene was obtained.

In another experiment 32 g. (0.2 mole) of chloral was placed in a glass liner of a rotating autoclave. The liner was sealed into the autoclave and nitrogen pressed in until an initial pressure of 30 atmospheres had been reached. The autoclave was heated to a temperature of about 300° C. and maintained thereat for a period of about 5.5 hours during which time the maximum pressure rose to 65 atmospheres. At the end of this time the autoclave and contents thereof were cooled to room temperature, the excess pressure vented and the liner opened to determine if any reaction had taken place. It was discovered that no reaction had occurred, but there was a substantial loss of chloral which was presumed to be due to the decomposition thereof.

Hexachlorocyclopentadiene was not heated by itself inasmuch as it is known from prior art that heating said compound to a temperature in the range of from about 225° to about 300° C. produces a compound having the empirical formula $C_{10}H_{18}$.

*Example IV*

A mixture of 28 g. (0.1 mole) of tribromoacetaldehyde and 57 g. (0.1 mole) of hexabromocyclopentadiene is placed in the glass liner of a rotating autoclave. This liner is then sealed into said autoclave and nitrogen is pressed in until an initial pressure of 30 atmospheres is reached. The autoclave and contents thereof are then heated to a temperature of about 300° C. and maintained thereat for a period of about 6 hours during which time the maximum pressure will rise to about 85 atmospheres. At the end of this time the autoclave and contents thereof is cooled to room temperature, the excess pressure may be vented or discharged through a soda lime tower and the reaction product is recovered from the liner. The product is then filtered to separate the crystalline material from the filtrate after which the latter is then subjected to fractional distillation under reduced pressure to recover an additional amount of desired product. The desired reaction product comprising hexabromobenzene having a melting point of 316° C. is separated and recovered.

*Example V*

A mixture of 20 g. (0.2 mole) of trifluoroacetaldehyde and 35 g. (0.2 mole) of hexafluorocyclopentadiene is placed in the glass liner of a rotating autoclave. This liner is then sealed into said autoclave and nitrogen is pressed in until an initial pressure of 30 atmospheres is reached. The autoclave and contents thereof are then heated to a temperature of about 300° C. and maintained thereat for a period of about 6 hours during which time the maximum pressure will rise to about 85 atmospheres. At the end of this time the autoclave and contents thereof is cooled to room temperature, the excess pressure may be vented or discharged through a soda-lime tower and the reaction product is recovered from the liner. The product is then filtered to separate the crystalline material from the filtrate after which the latter is then subjected to fractional distillation under reduced pressure thereby recovering an additional amount of desired product. The desired reaction product comprising hexafluorobenzene is separated and recovered.

I claim as my invention:

1. A process for the preparation of a polyhalo substituted benzene which comprises reacting a compound selected from the group consisting of halo substituted butadienes and halo substituted cyclopentadienes with a polyhalo substituted acetaldehyde at a temperature of at least 270° C., and recovering the resultant polyhalo substituted benzene.

2. A process for the preparation of a polyhalo substituted benzene which comprises reacting a compound selected from the group consisting of halo substituted butadienes and halo substituted cyclopentadienes with a polyhalo substituted acetaldehyde at a temperature of at least 270° C. and at a pressure in the range of from about 2 to about 100 atmospheres, and recovering the resultant polyhalo substituted benzene.

3. A process for the preparation of a polyhalo substituted benzene which comprises reacting a polyhalo substituted cyclopentadiene with a polyhalo substituted acetaldehyde at a temperature of at least 270° C. and at a pressure in the range of from about 2 to about 100 atmospheres, and recovering the resultant polyhalo substituted benzene.

4. A process for the preparation of a polyhalo substituted benzene which comprises reacting a polyhalo substituted butadiene and with a polyhalo substituted acetaldehyde at a temperature of at least 270° C. and at a pressure in the range of from about 2 to about 100 atmospheres, and recovering the resultant polyhalo substituted benzene.

5. A process for the preparation of a polychloro substituted benzene which comprises reacting a polychloro substituted cyclopentadiene with a polychloro substituted acetaldehyde at a temperature of at least 270° C. and at a pressure in the range of from about 2 to about 100 atmospheres, and recovering the resultant polychloro substituted benzene.

6. A process for the preparation of hexachlorobenzene which comprises reacting hexachlorocyclopentadiene with trichloroacetaldehyde at a temperature in the range of from about 270° to about 325° C. and at a pressure in the range of from about 2 to about 100 atmospheres, and recovering the resultant hexachlorobenzene.

7. A process for the preparation of hexachlorobenzene which comprises reacting hexachloro-1,3-butadiene with trichloroacetaldehyde at a temperature in the range of from about 270° to about 325° C. and at a pressure in the range of from about 2 to about 100 atmospheres, and recovering the resultant hexachlorobenzene.

8. A process for the preparation of hexabromobenzene which comprises reacting hexabromocyclopentadiene with tribromoacetaldehyde at a temperature in the range of from about 270° to about 325° C. and at a pressure in the range of from about 2 to about 100 atmospheres, and recovering the resultant hexabromobenzene.

9. A process for the preparation of hexafluorobenzene which comprises reacting hexafluorocyclopentadiene with trifluoroacetaldehyde at a temperature in the range of from about 270° to about 325° C. and at a pressure in the range of from about 2 to about 100 atmospheres, and recovering the resultant hexafluorobenzene.

No references cited.